United States Patent [19]

Knecht et al.

[11] Patent Number: 4,994,134

[45] Date of Patent: Feb. 19, 1991

[54] METHOD OF MAKING A FERRULE HAVING ENHANCED CONCENTRICITY

[75] Inventors: Dennis M. Knecht; Joel C. Rosson, both of Hickory, N.C.

[73] Assignee: Siecor Corporation, Hickory, N.C.

[21] Appl. No.: 478,847

[22] Filed: Feb. 12, 1990

[51] Int. Cl.[5] .......................... B29C 65/78; G02B 6/36
[52] U.S. Cl. ..................................... 156/294; 29/464; 350/96.20
[58] Field of Search ...................... 156/294; 350/96.20; 269/52, 287; 29/464, 466, 467, 468, 272

[56] References Cited

U.S. PATENT DOCUMENTS

| | | | |
|---|---|---|---|
| 3,092,058 | 6/1963 | Feeler | 29/272 |
| 3,404,055 | 10/1968 | Wieland et al. | 156/294 |
| 3,861,781 | 1/1975 | Hasegawa et al. | 350/96.21 |
| 4,303,304 | 12/1981 | Ruiz | 350/96.20 |
| 4,396,247 | 8/1983 | Simon et al. | 350/96.20 |
| 4,636,033 | 1/1987 | Gagen | 350/96.21 |
| 4,842,363 | 6/1989 | Margolin et al. | 350/96.2 |
| 4,867,525 | 9/1989 | DiMarco et al. | 350/96.20 |
| 4,934,785 | 6/1990 | Mathis et al. | 350/96.2 |

FOREIGN PATENT DOCUMENTS 0642755 4/1984 Switzerland ...................... 350/96.2

*Primary Examiner*—Michael W. Ball
*Assistant Examiner*—Steven D. Maki
*Attorney, Agent, or Firm*—Roy B. Moffitt

[57] ABSTRACT

A method of making a two-layered (ceramic-glass) ferrule having a high degree of concentricity employing the steps of: (a) providing a tubular fixture; (b) inserting a ferrule fixture into a portion of the tubular fixture, the ferrule fixture having continuous and non-continuous channels, the concentricity of the continuous channel varying no more than two microns; (c) inserting a ceramic ferrule tubular member into the tubular fixture; (d) inserting a glass ferrule tubular member into the ceramic ferrule tubular member and into the non-continuous channel of the ferrule fixture; (e) inserting an alignment member, having a length greater than the glass ferrule tubular member and a diameter that matches the internal diameter of the glass ferrule tubular member and the continuous channel of said ferrule fixture within one micron, into the continuous channel of the ferrule fixture and into the glass ferrule tubular member; (f) bonding the ceramic ferrule tubular member to the glass ferrule tubular member to form a composite; and, (g) removing the alignment member and glass-ceramic composite from the tubular fixture.

14 Claims, 4 Drawing Sheets

1

METHOD OF MAKING A FERRULE HAVING ENHANCED CONCENTRICITY

BACKGROUND OF THE INVENTION

Ceramic-glass ferrules are used in the optical fiber industry to make a part used in optical connectors. An example is the optical connector and corresponding ceramic glass ferrule described in U.S. Pat. No. 4,867,525, the contents of which are incorporated herein by reference. More specifically, elements 12, and 18 of this patent comprise a ferrule combination of a ceramic sleeve 12 bonded to a glass insert 18. FIG. 1C of this disclosure is a cross section of a ceramic glass ferrule of this type.

A quality ceramic-glass ferrule requires a high degree of concentricity, the ferrule composite itself 7 being made up of one tube inserted into and bonded one to another. As can be seen in FIGS. 16 and 6, a ceramic-glass ferrule is basically a two part combination, a glass tube 2 or 16 nested inside and bonded to ceramic tube 1 or 15 respectively. In use however, this combination demands that the concentricity of this combination be high. The prior art achieved this high degree of concentricity by grinding, an expensive and time-consuming process, using the apparatus diagrammatically shown in FIG. 2. Here, the ceramic-glass composite 7 is placed in a movable and rotatable chuck 6. TV camera 6 with 800X lens is locked in with a fixed X axis 9 shown by dotted lines X—X. Chuck 6 is movable so that the center line or center axis of glass insert 2 of composite 7 can be made coincident with X axis 9, previously described. Thereafter, chuck 6 is rotated and grinding means 8, movable along a path perpendicular to the X—X axis, is moved into contact with ceramic sleeve 1 to grind it, thus making ceramic sleeve 1 concentric with glass tubular insert 2 to within 8 microns. This process is expensive, presently costing over two dollars for each ceramic-glass ferrule and obviously time consuming.

Employing the method steps of the present invention, a ceramic-glass ferrule of high concentricity is achieved during the bonding of glass insert 16 to ceramic sleeve 15, a concentricity that varies no more than 7 microns. High concentricity, in the context of this disclosure, means that the distance between the center line axis of the ceramic-glass composite continuous channel 18, namely the continuous channel of the glass tubular member 16, and the outside surface of the ceramic tubular member 15 as measured from place to place along the longitudinal axis of the glass-ceramic ferrule, varies no more than eight microns.

BRIEF DESCRIPTION OF THE INVENTION

The present invention is a method of making a two-layered (ceramic-glass) ferrule having a high degree of concentricity. The method employs steps of: (a) providing a tubular fixture, essentially a jig; (b) inserting a ferrule fixture into one end portion of the jig. The ferrule fixture has continuous and non-continuous channels in communication with one another and the concentricity of the continuous channel deviates no more than two microns, as measured from place to place along the longitudinal axis of the ferrule fixture from center line of continuous channel to outermost surface; (c) inserting a ceramic tubular ferrule into another portion of the tubular fixture; (d) inserting a glass ferrule tubular member into the ceramic ferrule tubular member and into the non-continuous channel of the ferrule fixture; (e) inserting an alignment member, preferably a steel wire having a length greater than the glass ferrule tubular member and a diameter that matches the internal diameter of the glass ferrule tubular member and the continuous channel of said ferrule fixture within one micron, into the continuous channel of the ferrule fixture and into the glass ferrule tubular member; (f) bonding the ceramic ferrule tubular member to the glass ferrule tubular member to form a composite; and (g) removing the glass-ceramic composite from the tubular fixture and the alignment member from the glass ferrule tubular member and ferrule fixture.

For the purposes of this disclosure, all parts identified as ceramic are articles of manufacture made from a material that has a crystallized or partly crystallized structure and may contain some glass. The article is produced from essentially inorganic non-metallic substances by forming from a molten mass which solidifies on cooling or is formed and simultaneously or subsequently matured by the action of heat. A glass ferrule, as contemplated herein, is a ferrule made of a material that is an inorganic product of fusion that has cooled to a rigid condition without crystallizing. A preferred embodiment of glass is a borosilicate glass made by Corning, Incorporated.

DETAILED DESCRIPTION OF THE INVENTION

Figure 7:
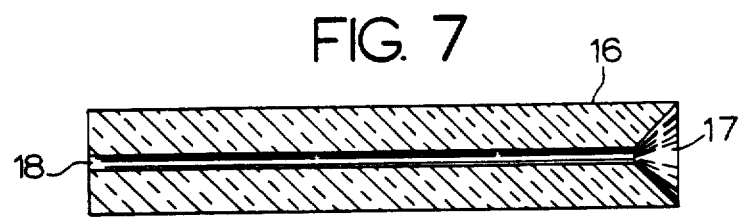
FIG. 7 is a cross-sectional view of a glass insert used to make a glass-ceramic ferrule.

Prior art glass-ceramic ferrule 7 and method of making same is shown in FIGS. 1a, 1b, 1c, and 2. Ceramic sleeve 1, with continuous channel 3, having a reduced end portion as shown is provided. Into continuous channel 3, there is disposed glass ferrule 2 having a continuous channel 4. An end portion of glass ferrule 2 has a lead-in configuration provided by a converging sidewall. See also element 17 of FIG. 7. Glass ferrule 2 is inserted inside of ceramic sleeve 1 and bonded thereto by a heat curable epoxy resin sold underneath the trade name of Tra-con made by Tra-Con, Inc. In use, an optical fiber (not shown) is inserted inside continuous channel 4 and bonded to the glass ferrule 2 by means of an ultraviolet light cured adhesive sold underneath the trade name of Norland 81 made by Norland, Inc. The optical fiber may be one manufactured by Corning Incorporated bearing Glass Code Number 7940, having a Knoop hardness of 489. Glass ferrule 2 may be a clear borosilicate glass manufactured by Corning Incorporated having a glass code number 7740 and a Knoop hardness of 418. Also, the preferred material for glass ferrule 16 is a clear borosilicate glass manufactured by Corning Incorporated having a glass code number 7740 and a Knoop hardness of 418. It will be noted that the optical fiber (not shown) has a hardness greater than that of glass ferrule 2.

The composite 7 (Figure 1C) of the prior art, immediately after glass ferrule 2 is bonded to ceramic sleeve 1, did not have the desired concentricity as previously defined. Consequently, composite 7 had to be ground to achieve the concentricity required. This grinding was done with the apparatus shown in FIG. 2. The reduced end portion of composite 7 was placed in chuck 6. Chuck 6 was moved until the X-axis 9 of TV camera and lens 5 were coincident with the longitudinal axis of both glass ferrule 2 and the ceramic sleeve 1. At this point, chuck 6 was stabilized and rotated therefore rotating composite 7. Grinding wheel 8, rotating in an opposite direction, is moved into contact with composite 7 so as to grind same. By so doing, the concentricity distance of the outer surface of composite 7 from the X-axis is more than 8 microns as measured from place to place along the X-axis. As previously discussed, this is an expensive and time-consuming operation.

Figure 1A:
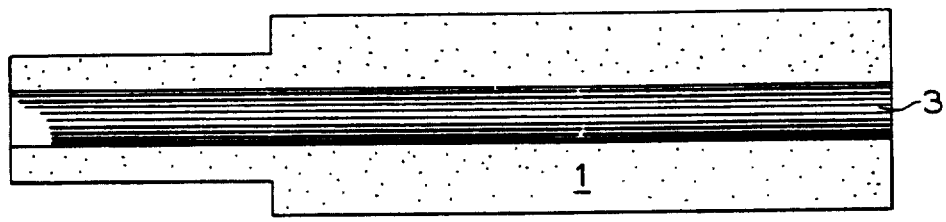
FIG. 1A is a cross-sectional view of a prior art ceramic outer sleeve of a glass-ceramic ferrule.
Figure 1B:
FIG. 1B is a cross-sectional view of a prior art glass ferrule of a glass-ceramic ferrule.
Figure 1C:
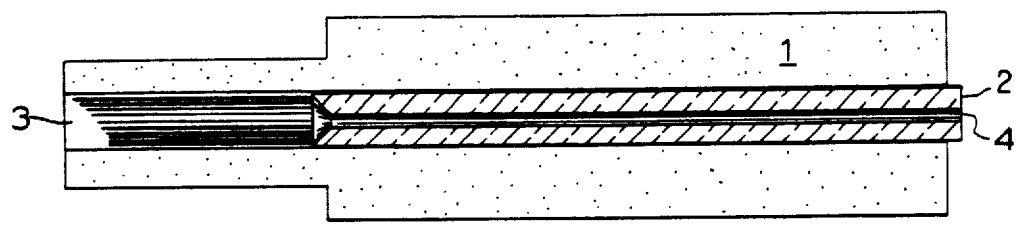
FIG. 1C is a cross-sectional view of a prior art glass-ceramic ferrule.
Figure 2:
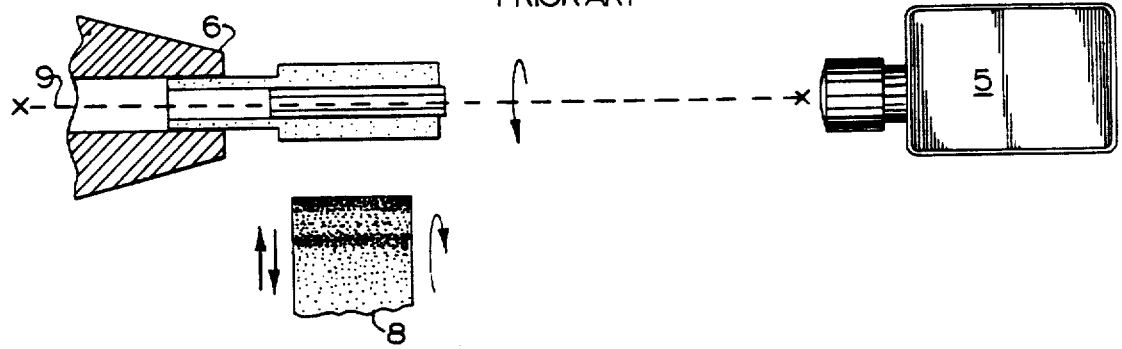
FIG. 2 is a schematic representation of apparatus employed to grind the glass-ceramic ferrule of FIG. 1C to a desired degree of concentricity.
Figure 3:
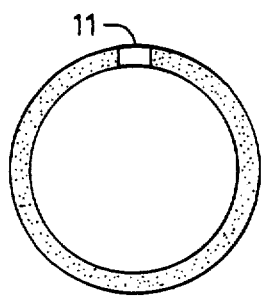
FIG. 3 is a side elevation of split-ferrule tubular fixture.
Figure 4:
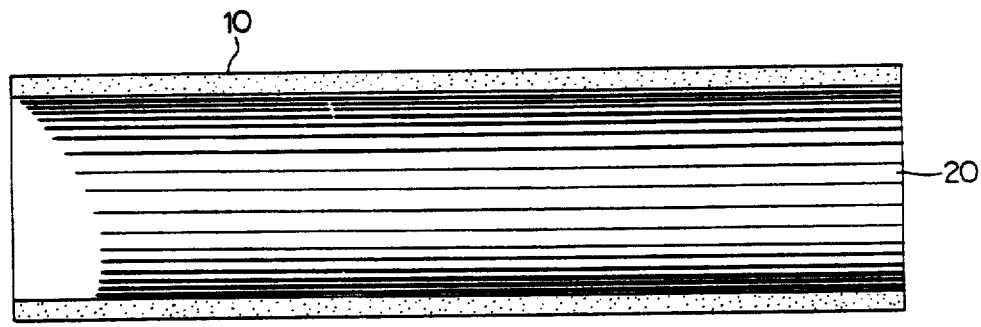
FIG. 4 is a front elevation cross-sectional view of a split ferrule tubular fixture.
Figure 5:
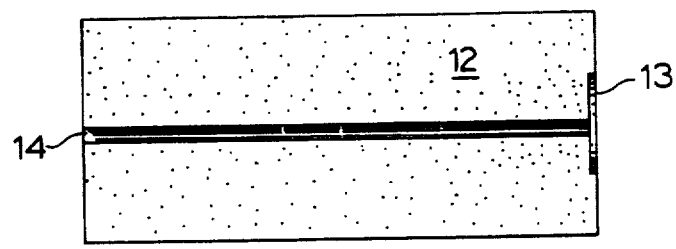
FIG. 5 is a cross-sectional view of a ceramic ferrule fixture.
Figure 6:
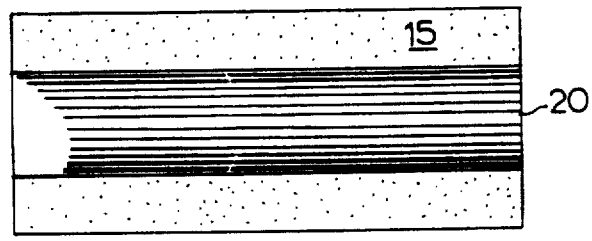
FIG. 6 is a cross-sectional view of a ceramic outer sleeve of a glass-ceramic ferrule.

The present invention involves the method steps and apparatus shown in FIGS. 3, 4, 5, 6, 7, 8, 9, and 10. Tubular fixture 10 is shown in side elevation and front cross section in FIGS. 3 and 4 respectively. Tubular fixture 10 has slit 11 in its sidewall that may extend for at least a portion along the longitudinal dimension of the sidewall. Shown in FIG. 5 is a ceramic ferrule fixture 12, which contains a continuous channel 14 and a non-continuous channel recess 13, the continuous channel communicating with the non-continuous channel. Also necessary is a ceramic sleeve or a first ferrule tubular member 15 having a continuous channel 20. As with the prior art, a glass ferrule or a second ferrule tubular member 16 is necessary that has continuous channel 18 and may have a lead-in portion at one terminal end portion. See converging sidewall 17.

Figure 8:
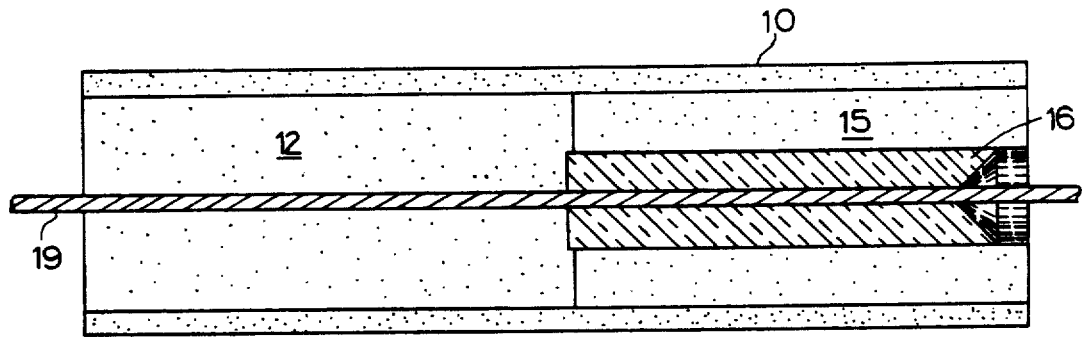
FIG. 8 is a cross-sectional view of the parts of FIGS. 3, 4, 5, 6, and 7 assembled to produce a glass-ceramic ferrule.
Figure 9:
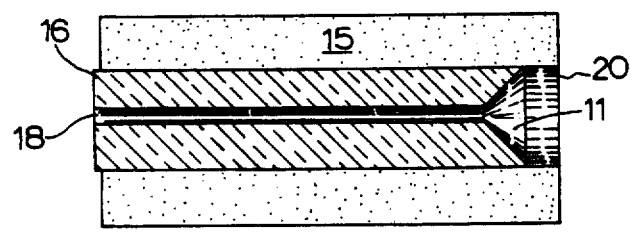
FIG. 9 is a front elevation of a glass-ceramic ferrule made by the method of the disclosed invention.
Figure 10:
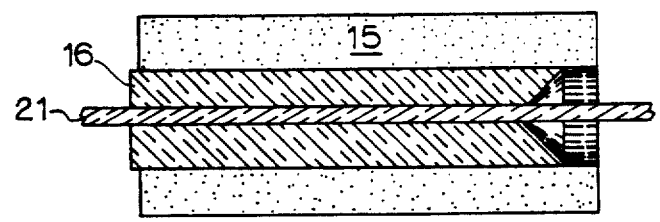
FIG. 10 is a cross-sectional view of a glass-ceramic ferrule bonded to an optical fiber.

Continuous channel 14 of ceramic ferrule fixture 12 is concentric with the outer surface of ferrule fixture 12 to the extent that the distance between the center axis of continuous channel 14 and the surface of ferrule fixture 12, measured from place to place, deviates no more than two microns. To carry out the invention with the above described apparatus, the following method may be followed: Referring to FIG. 8, ceramic ferrule fixture 12 is inserted in one end portion of tubular fixture 10. In the other portion of tubular fixture 10, a ceramic ferrule 15, which may be called a first ferrule tubular member is inserted. Then glass ferrule 16, which may be also called a second ferrule tubular member, is threaded onto a steel wire 19, an alignment member. The alignment member has an outside diameter that matches the inside diameter of continuous channel 14 of ceramic ferrule fixture 12 and second ferrule tubular member 16 within one micron. Alignment member 19 is inserted into continuous channel 14 and the second ferrule tubular member (glass ferrule) 16 is fitted onto alignment member 19, inserted into the first or ceramic ferrule tubular member 15 and into non-continuous channel 13. Prior to doing so, a portion of the outside surface of the glass ferrule or second ferrule tubular member 16 is coated with a heat curable epoxy such as that sold underneath the trade name of Tra-con. Then the assembled composite, shown in FIG. 8, is subjected to heat in order to cure the heat curable epoxy and thereby bond the second ferrule tubular member 16 to the first ferrule tubular member 15. Thereafter, such bonded composite is removed as shown in FIG. 9. It has the desired concentricity deviation of less than 8 microns.

In the field, an optical fiber 21, like that previously disclosed, is inserted inside of the glass or second ferrule tubular member 16, a portion of which has been coated with an ultraviolet curable epoxy such as that sold underneath the trade name of Norland 81, and subjected to an ultraviolet light to cure same and thus bond optical fiber 21 to the second ferrule tubular member 16. See FIG. 10. A preferred embodiment second or glass ferrule tubular member is made of the same material as the sleeve 18 of the prior art, namely, a borosilicate glass having a Knoop hardness of 418. It is preferred that optical fiber 21 have a hardness greater than that of element 16, preferably a Knoop hardness of 489. A protruding portion of optical fiber, shown protruding beyond the left-hand free edge of glass ferrule 16 is ground off by hand employing well-known materials and procedures.

What is claimed is;

1. A method of making a ferrule comprising:
 (a) providing a tubular fixture;
 (b) inserting a ferrule fixture into a portion of said tubular fixture, said ferrule fixture having a continuous channel and recess therein, said continuous channel having a concentricity that varies no more than two microns;
 (c) inserting a first ferrule tubular member into another portion of said tubular fixture;
 (d) inserting a second ferrule tubular member into said first ferrule tubular member and into said recess of said ferrule fixture;
 (e) inserting an alignment member, having a length greater than said second ferrule and a diameter that matches the internal diameter of said second ferrule tubular member and said continuous channel of said ferrule fixture within one micron, into said continuous channel of said ferrule fixture and into said second ferrule tubular member;
 (f) bonding said first ferrule tubular member to said second ferrule tubular member to form a composite; and,
 (g) removing said composite from said tubular fixture.

2. The method of claim 1 wherein said a continuous channel and recess of said ferrule fixture communicate with one another.

3. The method of claim 1 wherein said ferrule fixture abuts said first and second ferrule tubular member.

4. The method of claim 1 wherein said tubular fixture has an elongated slit therein.

5. The method of claim 1 wherein the step of bonding said first ferrule to said second ferrule tubular member is achieved by an ultra violet light and/or heat curable adhesive.

6. The method of claim 5 including the further steps of inserting an optical fiber in said second ferrule tubular member and bonding said optical fiber to said second ferrule tubular member.

7. The method of claim 6 wherein said optical fiber is harder than the second ferrule tubular member.

8. The method of claim 1 wherein said first ferrule tubular member is made from a ceramic material.

9. The method of claim 8 wherein said second ferrule tubular member is made from a glass.

10. The method of claim 9 wherein said tubular fixture is made from a ceramic material.

11. The method of claim 1 wherein one terminal end portion of said second ferrule tubular member has a sidewall that converges.

12. The method of claim 6 wherein the optical fiber is a multi-mode fiber.

13. The method of claim 1 wherein said second ferrule tubular member is threaded onto said alignment member and subsequently a portion of said alignment member is inserted into said ferrule fixture and said second ferrule tubular member is inserted into said first ferrule tubular member.

14. The method of claim 1 wherein said alignment member is a metal wire.

* * * * *